United States Patent
Charvet et al.

(10) Patent No.: US 9,495,739 B2
(45) Date of Patent: Nov. 15, 2016

(54) METHOD AND SYSTEM FOR VALIDATING IMAGE DATA

(71) Applicant: BARCO N.V., Kortrijk (BE)

(72) Inventors: Edouard Y-M J Charvet, Roncq (FR); Lieven W. Demeestere, Emelgem (BE); (Continued)

(73) Assignee: ESTERLINE BELGIUM BVBA, Duluth, GA (US)

( * ) Notice: Subject to any disclaimer, the term of this patent is extended or adjusted under 35 U.S.C. 154(b) by 0 days.

(21) Appl. No.: 14/430,329

(22) PCT Filed: Sep. 23, 2013

(86) PCT No.: PCT/IB2013/002092
§ 371 (c)(1),
(2) Date: Mar. 23, 2015

(87) PCT Pub. No.: WO2014/045107
PCT Pub. Date: Mar. 27, 2014

(65) Prior Publication Data
US 2015/0206299 A1    Jul. 23, 2015

Related U.S. Application Data

(63) Continuation of application No. 13/625,079, filed on Sep. 24, 2012, now Pat. No. 8,913,846.

(51) Int. Cl.
*G06K 9/00* (2006.01)
*G06T 7/00* (2006.01)
(Continued)

(52) U.S. Cl.
CPC .............. *G06T 7/0008* (2013.01); *G06T 1/20* (2013.01); *G06T 7/0004* (2013.01); *G09G 5/006* (2013.01);
(Continued)

(58) Field of Classification Search
CPC ..................... G06T 7/0008; G06T 1/20; G06T 7/0004; G09G 5/393; G09G 5/006
See application file for complete search history.

(56) References Cited

U.S. PATENT DOCUMENTS 5,365,596 A    11/1994  Dante et al.
5,982,399 A *  11/1999  Scully .................. G06T 15/405
                                                                345/522

(Continued)

FOREIGN PATENT DOCUMENTS

EP             0392328 A2    10/1990

OTHER PUBLICATIONS

International Search Report (ISR) dated Jun. 3 2014, for PCT/IB2013/002092.

(Continued)

*Primary Examiner* — Amir Alavi
(74) *Attorney, Agent, or Firm* — Bacon & Thomas, PLLC (57) ABSTRACT

A system and method for validating GPU rendered display data by comparing, across substantially all of the pixel locations in a frame, the GPU rendered display data to display data rendered by another processor. In this way, by checking substantially all of the pixel locations in a frame, errors in the display image data can be detected without prior knowledge of the format, layout, etc. of the display data. The system and method are capable of operating without receiving input from a user or producing output to a user, and without receiving input from other applications or producing output to other applications.

20 Claims, 10 Drawing Sheets

(72) Inventors: Maarten Zanders, Sint-Amandsberg (BE)

(51) Int. Cl.
*G09G 5/36* (2006.01)
*G06T 1/20* (2006.01)
*G09G 5/00* (2006.01)
*G09G 5/393* (2006.01)

(52) U.S. Cl.
CPC .............. *G09G 5/363* (2013.01); *G09G 5/393* (2013.01); *G06T 2207/10016* (2013.01); *G06T 2207/20036* (2013.01); *G06T 2207/30168* (2013.01); *G09G 2330/12* (2013.01)

(56) References Cited

U.S. PATENT DOCUMENTS

| | | | | |
|---|---|---|---|---|
| 5,990,911 A * | 11/1999 | Arrott | ................... | G06T 15/405 345/418 |
| 6,040,852 A | 3/2000 | Stuettler | | |
| 6,115,054 A * | 9/2000 | Giles | ......................... | G06T 1/20 345/522 |
| 6,734,854 B1 * | 5/2004 | Shimizu | ................ | G06T 15/405 345/422 |
| 6,771,269 B1 * | 8/2004 | Radecki | ................. | G09G 5/363 345/503 |
| 6,825,842 B1 * | 11/2004 | Troster | .................. | G06T 15/005 345/522 |
| 8,289,319 B2 * | 10/2012 | Nordlund | ................ | G06T 11/40 345/419 |
| 8,442,311 B1 * | 5/2013 | Hobbs | ....................... | G06T 9/00 382/166 |
| 8,553,037 B2 | 10/2013 | Smith et al. | | |
| 8,913,846 B2 * | 12/2014 | Charvet | ................ | G06T 7/0004 382/218 |
| 2004/0021666 A1 | 2/2004 | Soll et al. | | |
| 2004/0239763 A1 | 12/2004 | Notea et al. | | |
| 2007/0013693 A1 | 1/2007 | Hedrick | | |
| 2007/0222642 A1 | 9/2007 | Hedrick | | |
| 2012/0044359 A1 | 2/2012 | Voltz | | |
| 2015/0206299 A1 * | 7/2015 | Charvet | ................ | G06T 7/0004 345/589 |

OTHER PUBLICATIONS

Written Opinion dated Jun. 3, 2014, for PCT/IB2013/002092.
Second Written Opinion dated Oct. 14, 2014, for PCT/IB2013/002092.
International Preliminary Report on Patentability (IPRP) dated Feb. 4, 2015, for PCT/IB2013/002092.
European Official Communication dated Apr. 18, 2016, for EP 13799357.2.

* cited by examiner

METHOD AND SYSTEM FOR VALIDATING IMAGE DATA

This application is a 371 of PCT/IB2013/002092 Sep. 23, 2013 which is a CON of Ser. No. 13/625,079 Sep. 24, 2012 U.S. Pat. No. 8,913,846.

FIELD OF THE INVENTION

The present invention relates generally to display devices, and particularly to methods and systems for validating the data displayed on display devices.

BACKGROUND

It is important that data displayed on display devices in critical applications be free of hazardously misleading information (HMI). Undetected HMI—e.g., incorrectly displaying an "8" instead of a "3" on a primary flight display of an aircraft—can cause an undesired event having catastrophic consequences.

Modern display devices typically include commercial off the shelf (COTS) graphics processing units (GPUs) for generating display data and processing graphics intensive applications, such as enhanced or synthetic vision systems. Errors—e.g., design errors—in COTS GPUs have a direct contribution to the generation of HMI. COTS GPUs are highly complex designs, and it may be difficult to determine if there are errors in the devices. In addition, short lifecycles of COTS GPUs also make it difficult to obtain sufficient service experience to provide confidence that a COTS GPU will not generate HMI.

Architectural mitigation—e.g., GPU monitoring—is typically used to ensure protection against display of undetected HMI in critical applications.

SUMMARY OF THE INVENTION

The present invention provides a system and method for validating GPU rendered display data—e.g., a sequence of frames—by comparing, across substantially all of the pixel locations in a frame, the GPU rendered display data ("display image data") to display data rendered by another processor ("rendered image data"). In this way, errors in the display image data can be detected without prior knowledge of the format, layout, etc. of the display data.

The system and method may compare a region of interest (ROI) in each frame of the display image data to the same ROI in the rendered image data. The ROI may be varied between frames such that a combination of the ROIs from other frames encompasses substantially all of the pixel locations in a single frame of the display data. This technique may permit use of slower processors and/or processors—that are incapable of quickly validating an entire frame of the display data—to validate substantially all of the pixel locations in a frame of the display image data in a relatively short period of time (e.g., 500 milliseconds).

According to one aspect of the invention, there is provided a method of validating image data including a sequence of frames. The method includes: receiving a plurality of regions of interest, wherein each region of interest corresponds to a plurality of pixel locations in a frame of the image data. The method may further include, for each of a plurality of the received regions of interest, receiving drawing commands to generate a frame of the image data, capturing a frame of display image data including image data corresponding to the region of interest from the received drawing commands, generating rendered image data corresponding to the region of interest from the received drawing commands, and comparing the rendered image data corresponding to the region of interest to the display image data corresponding to the region of interest. A first of the plurality of received regions of interest and a second of the plurality of received regions of interest may correspond to different pixel locations.

According to one feature, each region of interest may encompass substantially all of the pixel locations in a frame of image data.

According to one feature, the combination of the plurality of regions of interest may encompass substantially all of the pixel locations in a frame of image data.

According to one feature, the first of the plurality of received regions of interest and the second of the plurality of received regions of interest may include overlapping pixel locations and different pixel locations.

According to one feature, the region of interest may be independent from user input.

According to one feature, the method may further include generating a notification if real defects are detected in comparing the rendered image data corresponding to the region of interest to the display image data corresponding to the region of interest. In addition, comparing the rendered image data corresponding to the region of interest to the display image data corresponding to the region of interest may include generating a difference image. Also, generating the difference image may include calculating a color distance measurement between the rendered image data corresponding to the region of interest to the display image data corresponding to the region of interest.

According to one feature, comparing the rendered image data corresponding to the region of interest to the display image data corresponding to the region of interest may include removing pixels in the difference image not having at least one neighboring bright pixel in a horizontal direction and at least one neighboring bright pixel in a vertical direction.

According to one feature, removing pixels in the difference image may include performing morphological erosion on the difference image with a structuring element. The structuring element is shaped to remove pixels not having at least one neighboring bright pixel in a horizontal direction and at least one neighboring bright pixel in a vertical direction.

According to one feature, comparing the rendered image data corresponding to the region of interest to the display image data corresponding to the region of interest may further include filtering the difference image with a filter designed to reduce the intensity of isolated pixels in the difference image.

According to one feature, comparing the rendered image data corresponding to the region of interest to the display image data corresponding to the region of interest may further include thresholding the difference image with an intensity threshold and detecting areas containing a number of pixels greater than an area count threshold.

According to one feature, comparing the rendered image data corresponding to the region of interest to the display image data corresponding to the region of interest may further include generating a notification if areas are detected containing a number of pixels greater than the area count threshold.

According to one feature, comparing the rendered image data corresponding to the region of interest to the display image data corresponding to the region of interest may further include removing a background of the display image data corresponding to the region of interest prior to generating the difference image.

According to one feature, the background of the display image data corresponding to the region of interest is removed by discarding pixels in the display image data corresponding to the region of interest having a value in an alpha channel less than an alpha threshold.

According to one feature, the alpha channel value is set by a software renderer.

According to one feature, a computer device may include a processor adapted to perform the method of validating image data including a sequence of frames.

According to one feature, the number of pixel locations corresponding to each region of interest is based on a processing speed of the processor.

According to one feature, a method of validating image data may include receiving drawing commands to generate a frame of image data, capturing a frame of display image data, and generating rendered image data corresponding to a plurality of pixel locations encompassing substantially all of the pixel locations in the image data. The method may also include comparing the rendered image data to the display image data.

According to another aspect of the invention, a display system for validating image data including a sequence of frames to be displayed. The system may include receiving a plurality of regions of interest at a processor. Each region of interest corresponds to a plurality of pixel locations in a frame of the image data. The system may also include, for each of a plurality of the received regions of interest, receiving drawing commands at a graphics processor to generate a frame of the image data, the processor capturing a frame of display image data generated by the graphics processor including image data corresponding to the region of interest from the received drawing commands. In addition, the system may include receiving the drawing commands at the processor, the processor generating rendered image data corresponding to the region of interest from the received drawing commands, and the processor comparing the rendered image data corresponding to the region of interest to the display image data corresponding to the region of interest.

According to one feature, a first of the plurality of received regions of interest and a second of the plurality of received regions of interest correspond to different pixel locations.

According to one feature, each region of interest encompasses substantially all of the pixel locations in a frame of image data.

According to one feature, the processor may include multiple processing units.

The features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope.

Features that are described and/or illustrated with respect to one embodiment may be used in the same way or in a similar way in one or more other embodiments and/or in combination with or instead of the features of the other embodiments.

DETAILED DESCRIPTION OF THE INVENTION

The present invention provides a system and method for validating GPU rendered display data to detect the presence of defects. The display data may include, e.g., a sequence of frames. Validating GPU rendered display data involves comparing—across substantially all of the pixel locations in a frame—display data rendered by the GPU ("display image data") to display data rendered by another processor ("rendered image data"). In this way, because substantially all of the pixel locations are validated, errors in the display image data can be detected without prior knowledge of the format, layout, etc. of the display image data.

There are a variety of ways to monitor display data generated by a GPU for defects. For example, two GPUs may be used to generate a region of the display and predetermined pixels in the region may be compared for differences. In another example, a template image known to contain correctly rendered symbols may be generated for a region of the display known to contain critical information. One potential disadvantage of such methods is that they require the format and/or layout of the display data be known.

Figure 1:
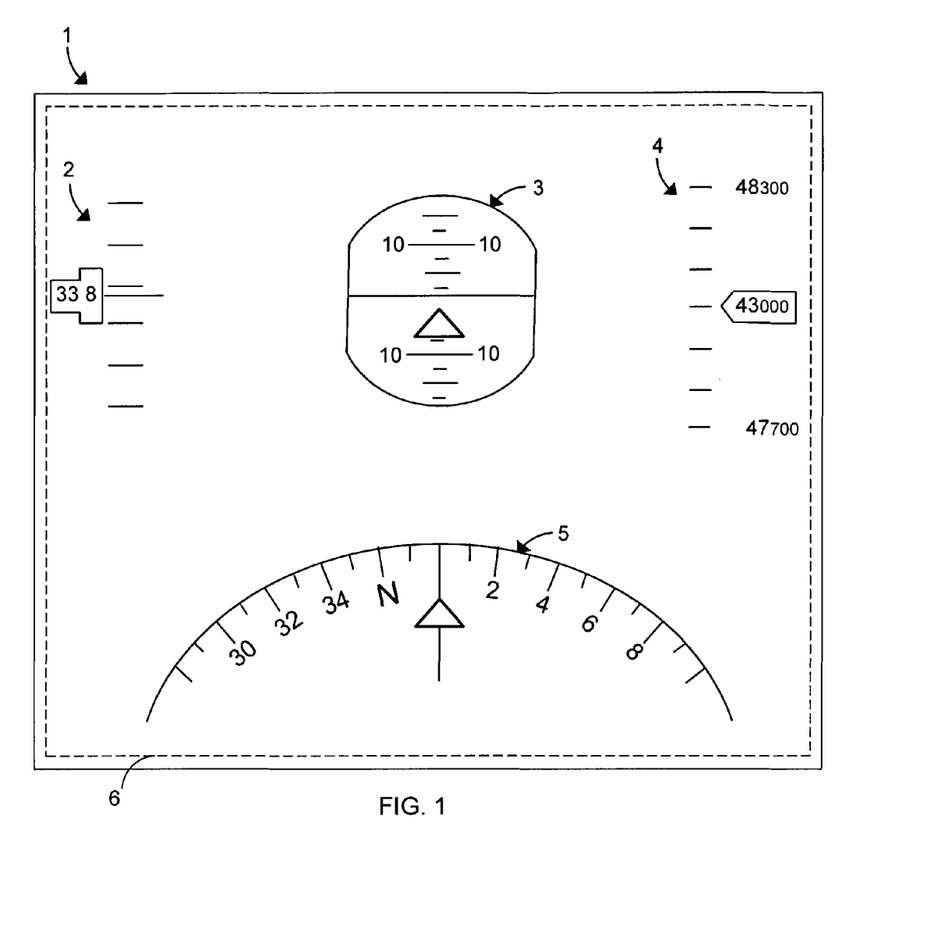
FIG. 1 is a representation of an exemplary primary flight display.

Turning initially to FIG. 1, an exemplary primary flight display 1 is shown. Multiple fields of information are presented on the display 1, including, e.g., airspeed 2, attitude indicator 3, altitude 4, and compass heading 5. The exemplary primary flight display 1 contains a real defect in the displayed altitude 4. An error in the rendering of the primary flight display 1 has resulted in the "8" in "48000" to be displayed as a "3". Such real defects in display data have the potential to cause potentially catastrophic consequences in an aircraft if unnoticed.

Figure 2A:
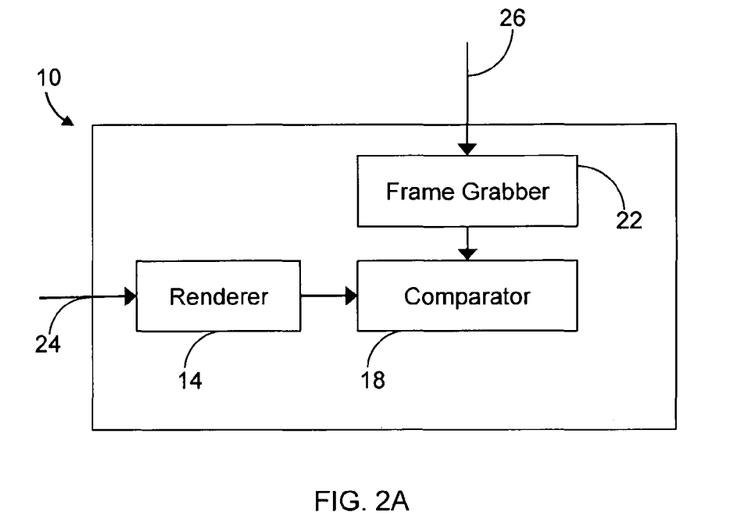
FIGS. 2A-B are block diagrams illustrating systems for validating GPU rendered display data.
Figure 2B:
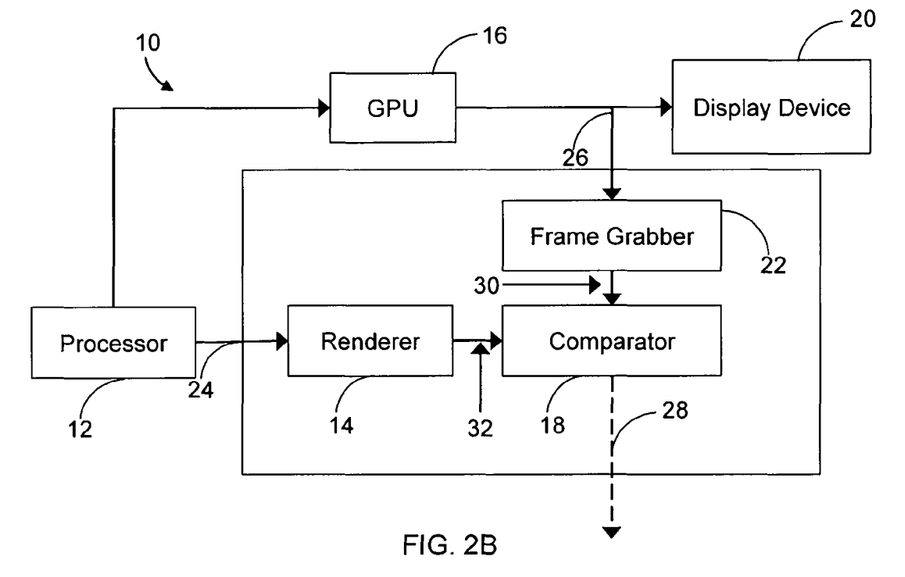
Figure 3:
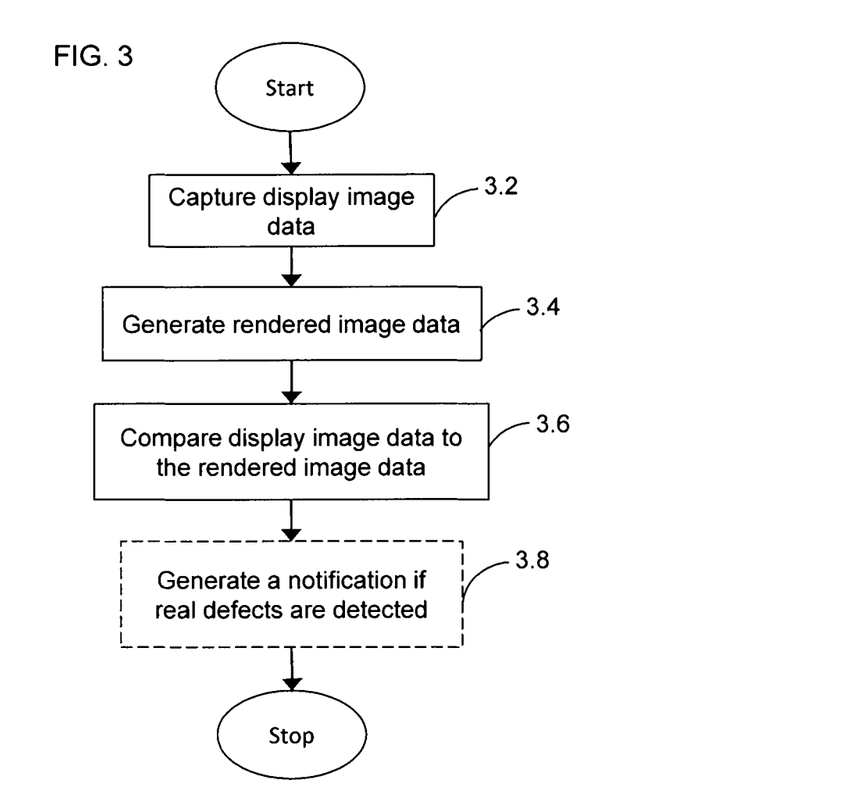
FIG. 3 is a block diagram illustrating a method for validating GPU rendered display data.

Turning to FIGS. 2A and 3, the system 10 includes a renderer 14, a comparator 18, and a frame grabber 22. As shown in FIG. 2B, the system may additionally include a processor 12, a GPU 16, and a display device 20. The renderer 14, comparator 18, processor 12, and GPU 16 can each be separate physical components or one or more physical component including a combination of one or more of the renderer 14, comparator 18, processor 12, or GPU 16. The renderer 14 and GPU 16 may receive drawing commands and a plurality of regions of interest (ROIs). The drawing commands may include instructions for generating a sequence of frames of display data. For example, the drawing commands may include all the openGL calls that are performed for each frame of the display data. The drawing commands may also include DirectX calls or calls in any other suitable API or programming language.

The GPU 16 may generate display image data 30 from the drawing commands for display on a display device 20. The drawing commands may be generated by the processor 12, which may additionally generate a plurality of ROIs. The ROIs may include a plurality of pixel locations in a frame of the image data. The drawing commands are also received by the renderer over input 24. Both the GPU 16 and the renderer 14 receive the same drawing commands, although the drawing commands may have different formats as will be understood by one of ordinary skill in the art. For example, the renderer 14 may be configured to generate rendered image data 32 from the drawing commands. If the GPU 16 is functioning properly, the output of the GPU 16 will approximately match the output of the renderer 14. Accordingly, the output of the renderer 14 may be compared with the output of the GPU 16. It will be understood, however, that there may be slight differences between the output of the renderer 14 and the output of the GPU 16 resulting from use of different algorithms by the GPU 16 and the renderer 14.

As will be understood by one of ordinary skill in the art, the renderer 14 may have various implementations. For example, the renderer 14 may be a software renderer carried out on the processor 12, another processor, programmable circuit, integrated circuit, memory and i/o circuits, an application specific integrated circuit, microcontroller, complex programmable logic device, other programmable circuits, or the like. The renderer 14 may also be another GPU— separate from the GPU 16—or other hardware renderer. For example, if the renderer 14 is another GPU, it may be desirable to use a GPU having a different design than the GPU 16 to ensure that the two GPUs do not have identical design errors.

With further reference to FIGS. 2A, 2B, and 3, the frame grabber 22 captures discrete frame information—which may be all or part of a frame—from the GPU output video stream 26—which may be created by the GPU 16 or processor 12. The frame grabber may capture discrete frame information at a capture rate that is lower than a frame rate of the output video stream 26. For example, the capture rate may be 5 Hz. The discrete frame information may not be captured from a memory buffer that stores the generated frame of image data or other similar component, because there is a risk of a read-error between the memory buffer and the GPU 16. The GPU 16 also contains hardware that outputs the display data to the video output 26 that may contain design errors. This hardware and the memory buffer may not be validated if the display image data 30 is not captured from the GPU output 26. In one example, frame grabber 22 is a field-programmable gate array (FPGA) capable of capturing on demand an image or stream of images from the video stream 26. In addition, as will be understood by one of ordinary skill in the art, the frame grabber 22 may have other implementations, and may be a programmable circuit, integrated circuit, memory and i/o circuits, an application specific integrated circuit, microcontroller, complex programmable logic device, other programmable circuits, or the like. The captured image data—i.e., display image data 30—is then sent to the comparator 18.

Thus, display image data 30 from the frame grabber 22 may be compared to the rendered image data 32 from the renderer 14. Such comparison may be made by the comparator 18. The comparator may be a processor or any other suitable device, such as a programmable circuit, integrated circuit, memory and i/o circuits, an application specific integrated circuit, microcontroller, complex programmable logic device, other programmable circuits, or the like.

With reference to FIG. 3, a block diagram depicting a method for validating display image data 30 is shown. In process block 3.2 display image data 30 is captured. The frame grabber 22 may perform the processes of block 3.2. Next, in process block 3.4, rendered image data 32 is generated. In process block 3.6, the display image data 30 is compared to the rendered image data 32. Optionally, in process block 3.8, a notification may be generated if real defects are detected. The comparator 18 may perform the processes of blocks 3.6 and/or 3.8.

Figure 4:
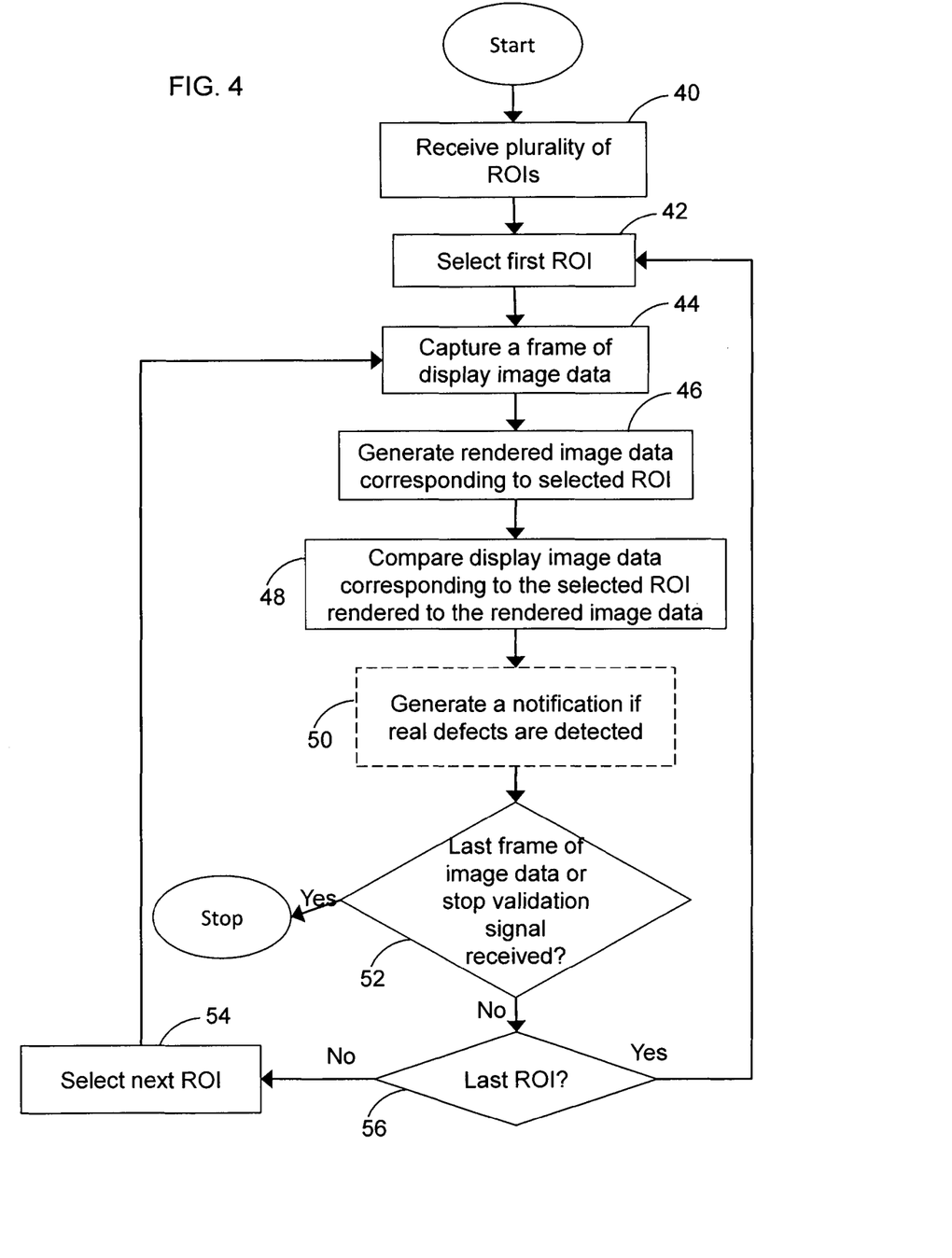
FIG. 4 is a block diagram illustrating a method for validating GPU rendered display data.
Figure 5:
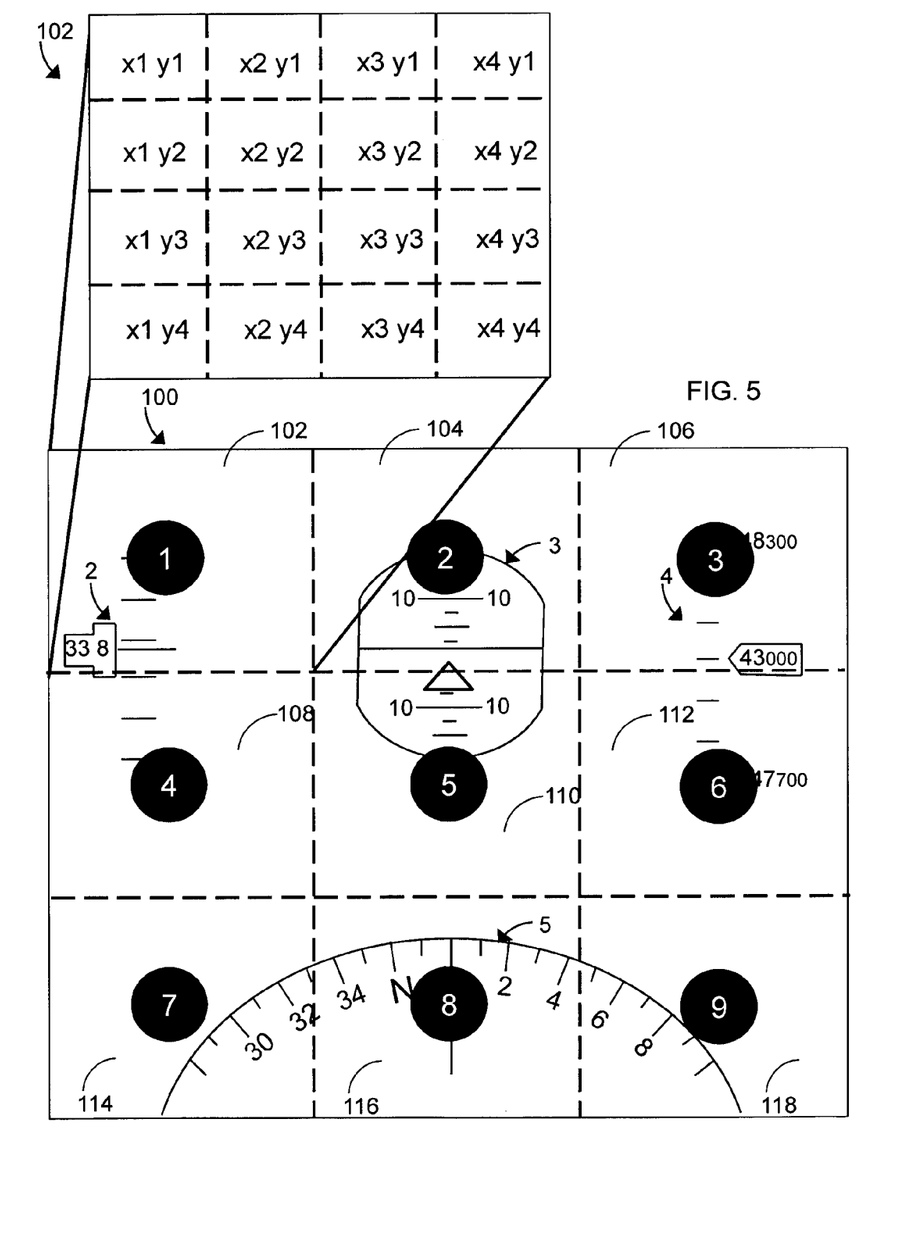
FIG. 5 is a representation of an exemplary primary flight display divided into regions of interest.

Depending on the speed of the components in the system, it may be desirable to compare only a portion of each frame to be displayed by the display device 20, rather than the entire frame. Accordingly, FIGS. 4-5 illustrate comparing a ROI in each captured frame that may be, but is not necessarily, smaller than substantially the entire frame to be displayed by the display device 20. Comparing only a portion of the frame may reduce performance requirements, thereby allowing the use of slower and cheaper processors, GPUs, etc. ROI may be varied between frames such that a combination of the ROIs from multiple frames encompass substantially all of the pixel locations in a single frame of the display data. For example, the combination of ROIs may be generated in multiple consecutive frames, although it need not be. Also, substantially all of the pixel locations in a single frame may correspond to a sufficient number of pixel locations to create a substantial likelihood that there is not an undetected real defect in the display image data 30. For example, the region 6 identified by the dotted line in FIG. 1 may be a sufficient number of pixel locations to create a substantial likelihood that there is not an undetected real defect in the display image data 30. In another example, a sufficient number of pixel locations to create a substantial likelihood that there is not an undetected real defect in the display image data 30 may be at least 90 percent of the pixels locations. Using this technique, the time required to validate an entire frame of the display will be dependent on the capture rate of the frame grabber 22 and the percentage of pixel locations in each ROI.

Accordingly, to accommodate slower systems, the number of pixels in each ROI can be decreased, thereby increasing the number of frames required to validate all or substantially all pixel locations. This technique allows for systems utilizing slower GPUs and/or processors—that are incapable of validating an entire frame of the display image data between frame captures—to validate substantially all of the pixel locations in a frame of the display data in a relatively short period of time and to partially validate each captured frame. Thus, if the frame grabber 22 has a capture rate of 5 Hz and each ROI comprises approximately one third of the total pixel locations, substantially all of the pixel locations could be validated within 600 milliseconds With further reference to FIGS. 4 and 5, following initialization of the method, flow progresses to process block 40 wherein a plurality of ROIs are received. A first ROI is then selected at process block 42. For example, a frame of image data 100 can be divided into nine ROI 102-118 as depicted in FIG. 5. Each ROI 102-118 may include a list of pixel locations. The first ROI 102 has been expanded to display the pixel locations in the first ROI 102. In the depicted example, the pixel locations are numbered by row (y) and column (x), but need not be, and the ROIs are displayed as contiguous and distinct blocks of pixels separated by dashed lines.

After the first ROI is selected in process block 42, a frame of display image data is captured in process block 44, e.g., by the frame grabber 22 from the output of the GPU 26. In the example, the display image data 100 and the first ROI 102 are shown in FIG. 5. Rendered image data corresponding to the selected ROI is generated in process block 46 by, e.g., the renderer 14 and compared to the corresponding display image data in process block 48 by, e.g., the comparator 18. The rendered image data may include only the selected ROI (corresponding to the first ROI 102 in this example), the entire frame 100, or the selected ROI and a portion of other ROIs. A notification can be optionally generated if real defects are detected between the display image data and the rendered image data in process block 50. The notification may take any form, such as an audible, tactile, or visual notification. For example, a real defect may be highlighted in the display image data 30 or a notification may be provided as a separate visual notification, such as an on-screen display. In addition, an audible alarm may be provided with or without a visual notification.

Following comparison of the display image data and rendered image data in process block 48, a check is performed to determine if the last frame of image data has been reached or if a stop validation signal has been received in decision block 52. A stop validation signal may be received or generated by the system at times when it is known that critical symbols are not contained in the display image data. At these times it may not be necessary to validate the GPU output. If the last frame has not been reached, a check is performed to determine if the last ROI in the plurality of ROIs has been reached in decision block 56. If the last ROI has been reached in decision block 56, the first ROI is selected in block 42 and the process is repeated. If the last ROI has not been reached in block 52, the next ROI is selected in process block 54 and the process is repeated. In the example, ROIs are labeled in order from ROI 1 102 to ROI 9 118. As the rendered image data and display image data is compared in subsequent frames, ROI 1 102 is compared followed by ROI 2 104, ROI 3 106, ROI 4 108, ROI 5 110, ROI 6 112, ROI 7 114, ROI 8 116, and ROI 9 118. When ROI 9 118 is reached, all of the pixel locations in the display image data have been validated and ROI 1 102 is selected as the next ROI.

The display image data and rendered image data often contain insignificant differences even when correctly rendered. These insignificant differences are often caused by different algorithms used for antialiasing (e.g., causing differences in terms of pixel shading/color), rasterizing (e.g., causing pixel alignment issues), alignment errors, and other differences between the images not caused by defects in the display image data. The insignificant differences are nearly always at most 1 pixel wide. The objective of the image comparison algorithm is to filter out these insignificant differences while detecting the real defects.

Figure 6:
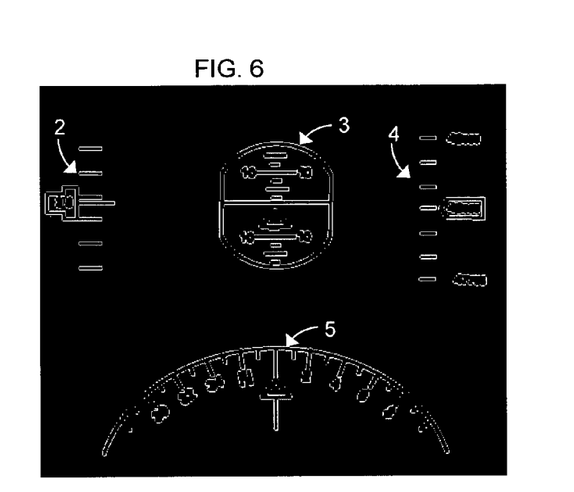
FIGS. 6-7 are representations of an exemplary difference image.
Figure 7:
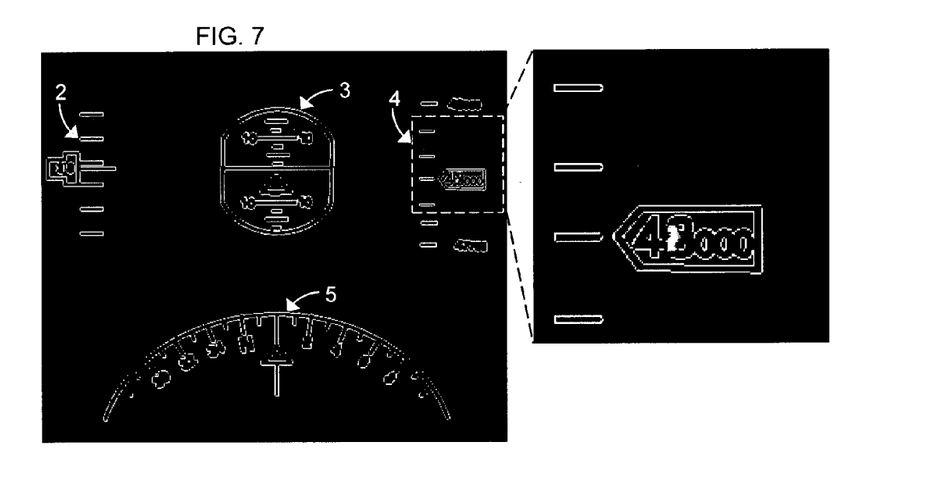

Turning to FIGS. 6-7, a difference image is used to compare the display image data and the rendered image data. The difference image represents the differences between the display image data and the corresponding rendered image data. For example, a difference image generated from accurately rendered display image data and rendered image data is depicted in FIG. 6. Differences between the rendered image data and display image data are depicted in the difference image as bright pixels. The bright pixels in the difference image of FIG. 6 are approximately one pixel wide and are due to different antialiasing and rasterizing algorithms used in the generation of the two sets of display data. Differences due to anti-aliasing, rasterizing, alignment, etc. have been enhanced in the figures in order to be more clearly visible. A difference image containing a real defect is depicted in FIG. 7. The difference image of FIG. 7 is generated from display image data in which an "8" was incorrectly rendered as a "3". This defect is depicted in a zoomed in view of FIG. 7 as a bright group of pixels.

Figure 8:
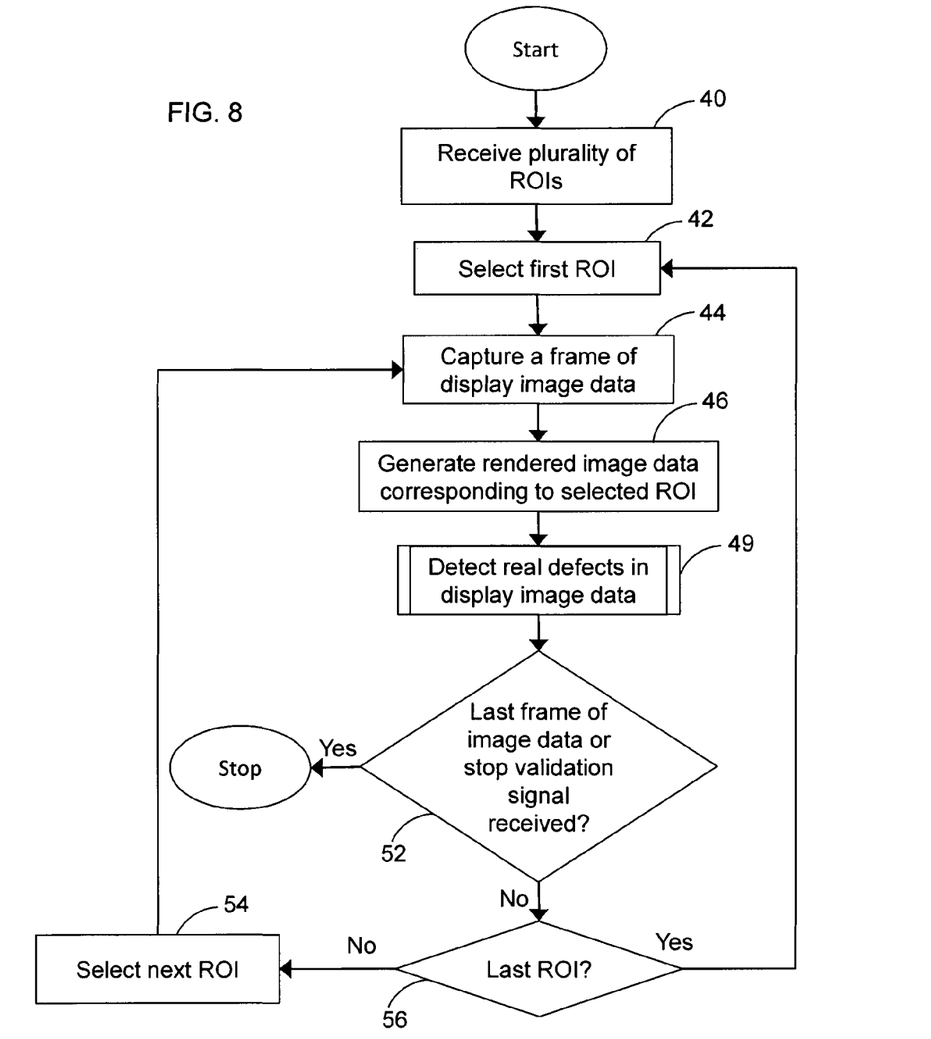
FIG. 8 is a block diagram illustrating a method for validating GPU rendered display data.
Figure 9:
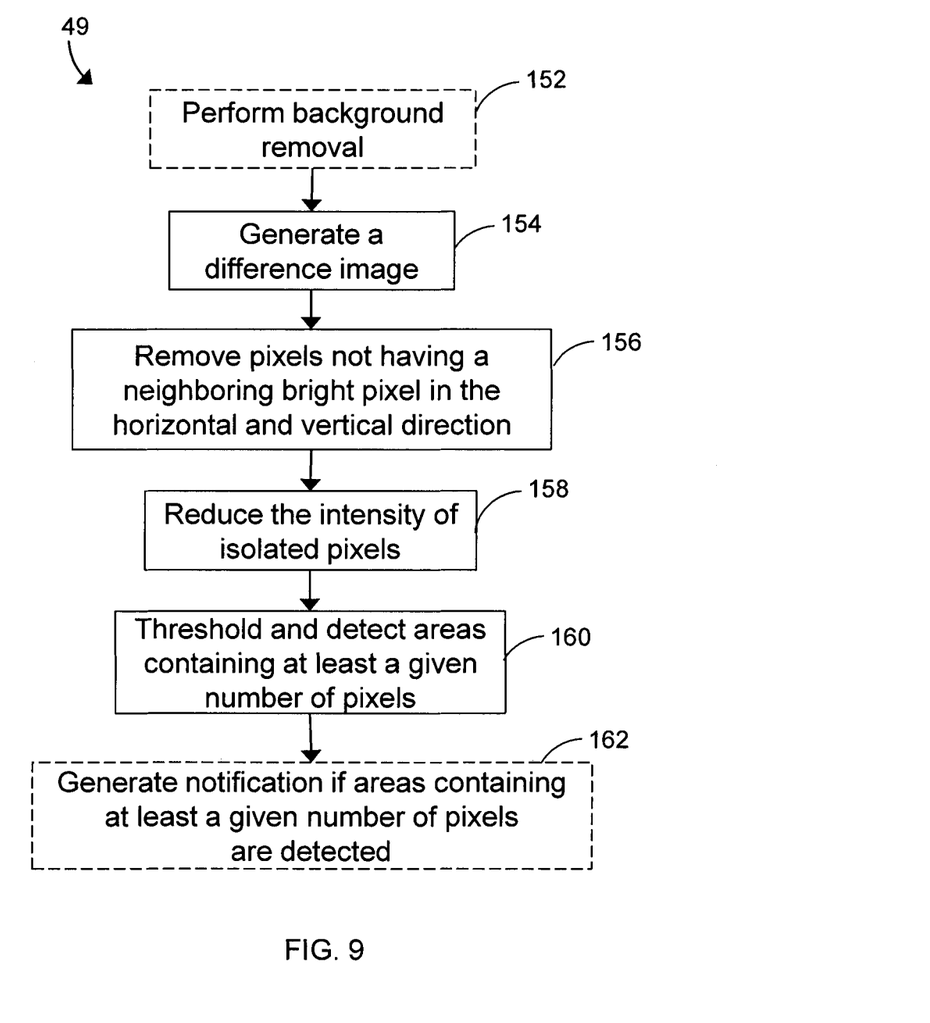
FIGS. 9-10 are block diagrams illustrating a method for detecting real defects in display image data.
Figure 11A:
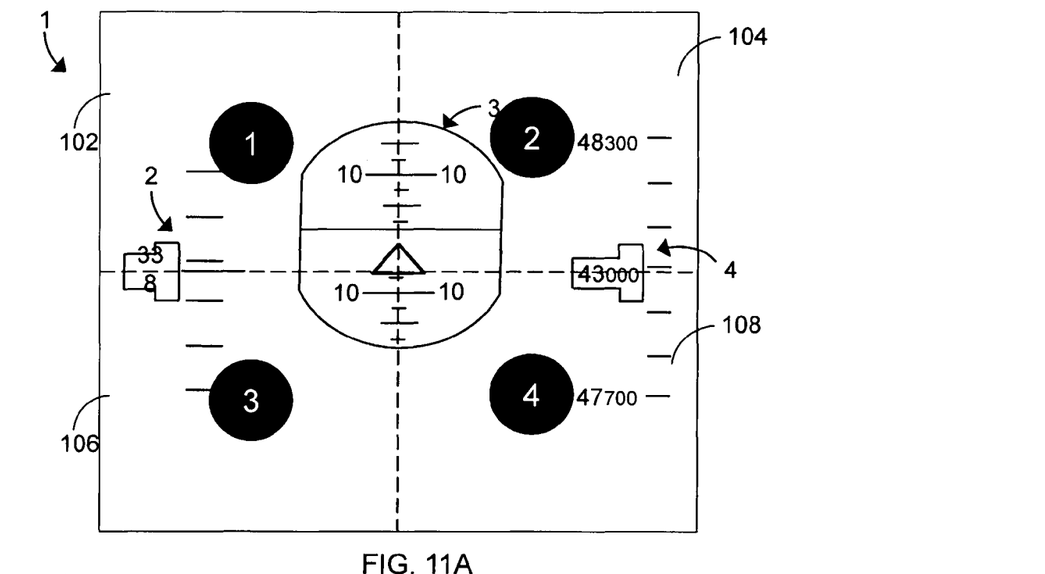
FIGS. 11A-B are representations of an exemplary primary flight display divided into regions of interest.
Figure 11B:
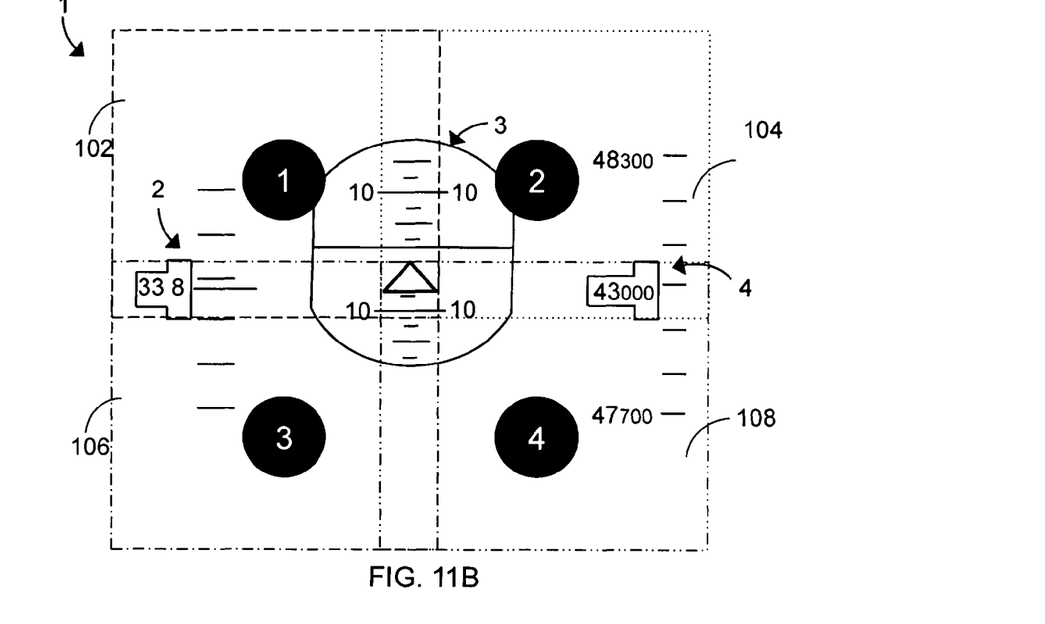

With further reference to FIGS. 8-9, the method steps are outlined in a flow diagram. In the method, a plurality of ROIs are received in process block 40. In one example, the complete list of ROIs—i.e., the plurality of regions of interest—can be cycled through one after another—e.g., each time a frame is captured, the next ROI is validated. That is, the ROI compared in each frame can be shifted progressively in time—i.e., in each consecutive captured frame—until the full image area is covered. As such, over time the full image area is compared by cycling through all of the plurality of ROIs. For example, a frame of image data 100 can be divided into nine consecutive and distinct ROIs as depicted in FIG. 5. In other examples, however, the pixels in a single ROI can be scattered throughout a frame, arranged in multiple groups, or be arranged in any suitable arrangement. ROIs in different frames can additionally include a list of pixel locations that overlaps completely, partially or not at all. For example, a frame of image data can be divided into four ROIs that overlap as depicted in FIG. 11B. Overlapping ROIs can improve the detection of real defects in image data. For example, the image data in FIG. 11A contains a real defect in the altitude indicator 4. The defect in the altitude indicator 4—the "8" in "48000" appears as a "3"—is split in half by the second 104 and fourth 108 ROI of FIG. 11A. Depending on how the defect is split between the ROIs, the defect may not be detected by the system in FIG. 11A. Dashed lines represent the boundaries between the ROI's 102-108 in FIG. 6A. Dividing the same frame of image data using overlapping frames as shown in FIG. 11B ensures that any defect smaller than the overlapping region of the ROIs will be included in a neighboring ROI. For example, the defect in the altitude indicator 4 is completely encompassed by the second 108 and fourth 108 ROI. The border of the first ROI 102 is depicted using a dashed line, the border of the second ROI 104 is depicted using a dotted line, the border of the third ROI 106 is depicted using a dashed and dotted line with a single dot, and the fourth ROI 108 is depicted using a dashed and dotted line with two dots.

Alternatively, rather than receiving the plurality of ROIs, the plurality of ROIs can be generated by the system. For example, the ROIs can be generated based on user selection, a default setting, the maximum ROI that the system is capable of comparing between frames, or by any other suitable means. For example, the system can automatically default to the largest ROI that the system can compare between frames if a user chooses a ROI larger than the maximum ROI. Alternatively, if a user chooses a ROI larger than the maximum ROI, the system can split the ROI into multiple ROIs that are validated over multiple frames. In another example, areas known to contain critical symbols can be contained in more ROIs than other areas of the image.

In addition, it will be understood by those of skill in the art that the system, such as that illustrated in either FIG. 2A or FIG. 2B, may be capable of operating without receiving input from a user or producing output to a user, and without receiving input from other applications or producing output to other applications. In this way, the validation would be invisible to a user and/or other applications.

It may not be necessary to validate the entire frame in some applications. In such applications, an area of the image can be designated to check for errors. If such an area is designated—e.g., by a user—only this area is validated. The designated area is not required to be a contiguous block of pixels, but may consist of scattered pixels, multiple groups of pixels, or any suitable list of pixel locations. The designated area may also be changed with time. If no area is specified, the full image is validated by the system. The full designated area may be checked in each frame if the size of the designated area is smaller than a maximum ROI—i.e., the largest ROI the system can compare between frames. If the designated area is larger than the maximum ROI, the full designated area is checked over several frames as described above. In one example, designated areas are defined once at startup for a given application and are not changed. Preventing the designated areas from changing at runtime can ensure that the designated areas aren't corrupted due to processor failure.

With further reference to FIG. 8, following generation of rendered image data in process block 46, detection of real defects in the display image data is performed in process block 49 by, e.g., the comparator 18. In FIG. 9, a difference image is generated to detect real defects in process block 49 by, e.g., the comparator 18. Pixels correctly generated in the display image data and rendered image data often have insignificant differences as described above. The insignificant differences are removed from the difference image to ensure they are not erroneously classified as real defects. Insignificant differences can be removed from the difference image by removing pixels not having at least one neighboring bright pixel in a horizontal direction and at least one neighboring bright pixel in a vertical direction in process block 156 by, e.g., the comparator 18. Pixels without bright neighbors are removed, because insignificant differences are typically 1 pixel wide at most and not aligned in two dimensions. Conversely, real defects in the display image data are retained, because real defects typically may include bright groups of pixels having bright neighbors in both directions. Real defects are also generally rather bright, because of the high contrast between foreground and background colors in the images. Conversely, insignificant differences are also typically dim, having a lower intensity than real defects.

The difference image is further modified by filtering the difference image to reduce the intensity of remaining isolated pixels in process block 158. The comparator 18 may perform the processes of blocks 156 and 158. After removing pixels not having bright neighbors in block 156, isolated pixels can remain in the difference image corresponding to misaligned/anti-aliased pixels. While the insignificant difference pixels are isolated, real defects are found in groups of pixels. Filtering is performed to lower the intensity of the remaining isolated pixels while increasing the intensity of the real defects—increasing the difference in intensity between the two groups of pixels—further distinguishing real defects from insignificant differences in the display image data.

The difference image is further modified by thresholding the image with an intensity threshold and detecting areas containing a number of pixels greater than an area threshold in process block 160. The intensity threshold is used to define the intensity above which pixels are considered to correspond to real defects. The result of thresholding is a binary image containing only the pixels classified as real defects. After intensity thresholding, if any pixel is erroneously classified as corresponding to a real defect, the pixels will be isolated or in very small groups scattered across the difference image. On the other hand, pixels corresponding to real defects are grouped in clusters. The area threshold is used to differentiate between the isolated insignificant differences and the clustered real defects. Thus, detecting areas with more pixels in a given area than the area threshold detects real defects in the display image data.

A notification may be generated if a real defect is detected in the difference image in process block 162. A real defect is detected in the difference image if an area contains more pixels than the area threshold. Depending on the context, it may not be necessary to notify a user of every defect detected. In other situations, however, it may be necessary or beneficial to generate a notification in each instance that a defect is detected. The monitoring status may be reported using a configurable output interface and/or configurable reporting format or protocol. The configuration allows the user to enable/disable this notification mechanism. The system can be capable of reporting its current operating status (e.g., actively validating frames on video link or idle). In one example, the system is capable of detecting and reporting the display of defective data within 500 ms. In another example, the generation of a notification is determined based on the type of application being displayed. In addition, whether a notification is generated, and what type of notification is generated, may be determined by one or more default settings.

The background of the display image data may be removed in process block 152 by, e.g., the comparator 18 before generation of the difference image. In some applications the display image data is a combination of a foreground image and a background image. Often, only the foreground image contains critical information that requires monitoring. In these cases, the background of the display image data can be removed to improve detection of real defects. For example, the background is typically removed in a synthetic vision system (SVS) application where the background includes 3D terrain information and the foreground includes the 2D primary flight display information displayed as an overlay. Background removal is useful in this example, because only the foreground layer contains critical information requiring monitoring and some renderers—e.g., software renderers—are often incapable of rendering the 3D terrain information due to performance limitations.

Figure 10:
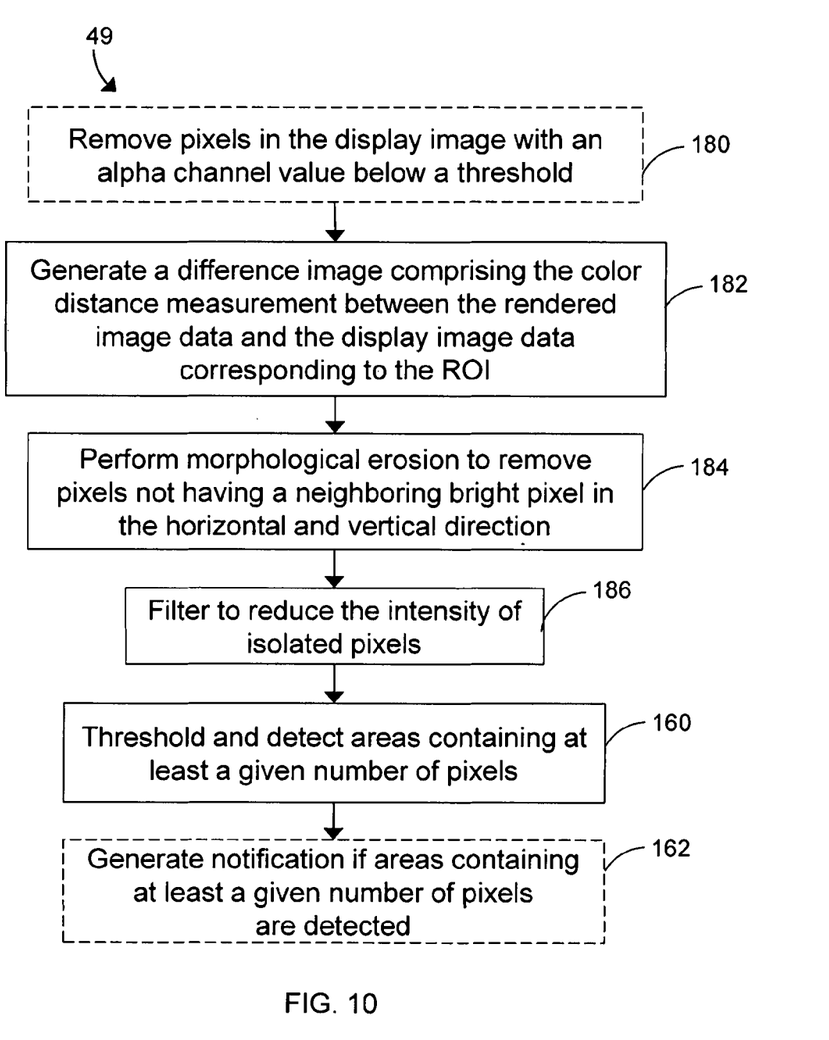

With reference to FIGS. 8 and 10, the method steps for detecting real defect in display image data 49 are outlined in a flow diagram. In process block 180, the background of the display image data can be removed using an alpha channel threshold. The rendered image data may include an alpha channel, e.g., that indicates which pixels belong to the foreground image. Pixels in the rendered image data alpha channel having a high alpha value correspond to foreground image pixels. Conversely, pixels in the rendered image data alpha channel having low alpha values correspond to pixels not belonging to the foreground image pixels, e.g., background image pixels. The foreground image pixel locations are determined by thresholding the rendered image data alpha channel with an alpha threshold to generate a binary alpha image. Pixels contained in the binary alpha image not equal to zero correspond to foreground image pixels. Pixels contained in a binary image may refer to only those pixels greater than the applied threshold.

In one example, any area of the display image data that contains characters or digits to be check is displayed on a fully filled colored area of the foreground image. A fully filled colored area ensures that the alpha channel for these areas is a full rectangle and not only the shape of the individual digits or characters. Failures can be miss detected if the background removal stage only considers the pixels corresponding to the digits rendered inside the rendered image data.

Following background removal in block 180, the difference image is generated from a color distance calculation between colored display image data and colored rendered image data in process block 182. The difference image can be a grayscale output image. The color distance can be calculated as the Euclidean distance between the two color values—e.g., red, green, and blue pixel intensity—of the corresponding pixels in the display image data and the rendered image data. If the color of the two corresponding pixels is identical, the color distance is zero—i.e., black in the grayscale difference image—for the location of the two pixels. For example, color distance (d) may be calculated for each pair of corresponding pixels—e.g., having the same pixel location—in the display image data (DID) and rendered image data (RID) using the following equation:

$$d = \sqrt{(DID_{Red} - RID_{Red})^2 + (DID_{Green} - RID_{Green})^2 + (DID_{Blue} - RID_{Blue})^2},$$

where $DID_{Red/Green/Blue}$ represents the intensity value of the Red/Green/Blue channel respectively of the display image data pixel and $RID_{Red/Green/Blue}$ represents the intensity value of the Red/Green/Blue channel respectively of the rendered image data pixel. Other difference measurements may be utilized in generating a difference image, e.g., subtraction, least square error, Euclidian distance, and any other suitable difference measurement. The difference measurement may be calculated using different color spaces or image spaces, e.g., HSV, HSI, HSL, CIE, CIELAB, CIECAM02, CMYK, NCS, OSA-UCS, and any other suitable method of representing a pixel.

The difference image is further modified by performing "+" shaped morphological erosion to remove pixels not having bright neighbors in the vertical and horizontal directions in process block 184. Erosion using a "+" shaped structuring element is used to remove pixels from the difference image corresponding to anti-aliased/misaligned pixels without removing pixels corresponding to real defects. During erosion, a pixel is retained only if it has at least one neighboring pixel with intensity greater than an erosion threshold in the horizontal direction and the vertical direction. Erosion effectively removes bright pixels caused by misalignment that would not be removed using the pixel intensity. Furthermore, erosion is very efficient at removing anti-aliasing differences, because anti-aliasing typically produces low intensity differences, making it improbable that an artifact from anti-aliasing will have two bright neighbors. In one example, the font thickness utilized in the display image data is greater than one pixel to limit the risk of misdetection of real defects.

With further reference to FIG. 10, the difference image is again modified by applying a filter to reduce the intensity of isolated pixels, while increasing the intensity of groups of pixels in process block 186. The filter first sums the intensity of all the pixels surrounding the pixel of interest and divides the result by a number less than the number of pixels summed before clamping the result. For example, if a 3×3 filter is used, the intensity of eight neighboring pixels and the pixel of interest are summed. The sum is then divided by a number less than the number of pixels summed. In this example nine pixels were summed and the sum is divided by four. This result is then clamped to 255. Dividing by four instead of nine performs a saturation of the result when clamped to 255. The saturation stage normalizes the differences in intensity that can exist between real defects. A 3×3 filter with a divisor equal to four and clamping value of 255 is only an example. Other filter sizes, divisors, and clamping values are contemplated.

A notification may be generated in block 162 as described above if a real defect is detected in the difference image. A real defect is detected in the difference image if an area is found containing more pixels than the area threshold. In one example, the area threshold includes an area count threshold and an area gap threshold. The area count threshold defines the number of pixels that must be found in the same area to be considered a real defect. Two pixels are only considered part of the same area if they are a distance apart less than an area gap size threshold. The area gap size threshold ensures that two unrelated pixels are not erroneously classified as part of the same area or defect.

The steps described in the flow diagram in the appended figures can be performed by the comparator, an image processor (not shown), the processor, or using any other suitable component or arrangement of components.

As used herein, the terms "display" and "display device" are not intended to be limited to any particular types of displays, and include such things as cathode ray tube devices, projectors, and any other apparatus or device that is capable of displaying an image for viewing.

The invention claimed is:

1. A method of validating image data comprising a sequence of frames, the method comprising:
   receiving a plurality of regions of interest, wherein each region of interest corresponds to a plurality of pixel locations in a frame of the image data;
   for each of a plurality of the received regions of interest,
      receiving drawing commands to generate a frame of the image data,
      capturing a frame of display image data including image data corresponding to the region of interest from the received drawing commands,
      generating rendered image data corresponding to the region of interest from the received drawing commands, and
      comparing the rendered image data corresponding to the region of interest with the display image data corresponding to the region of interest; and
   varying the region of interest between frames such that a combination of regions of interest from other frames encompasses substantially all of the pixel locations in a single frame of the display data.

2. The method of claim 1, wherein the first of the plurality of received regions of interest and the second of the plurality of received regions of interest comprise overlapping pixel locations and different pixel locations.

3. The method of claim 1, wherein the region of interest is not dependent on user input.

4. The method of claim 1, further comprising generating a notification if real defects are detected in comparing the rendered image data corresponding to the region of interest to the display image data corresponding to the region of interest.

5. The method of claim 4, wherein comparing the rendered image data corresponding to the region of interest to the display image data corresponding to the region of interest comprises generating a difference image.

6. The method of claim 5, wherein generating the difference image comprises calculating a color distance measurement between the rendered image data corresponding to the region of interest to the display image data corresponding to the region of interest.

7. The method of claim 5, wherein comparing the rendered image data corresponding to the region of interest to the display image data corresponding to the region of interest further comprises removing pixels in the difference image not having at least one neighboring bright pixel in a horizontal direction and at least one neighboring bright pixel in a vertical direction.

8. The method of claim 7, wherein removing pixels in the difference image comprises performing morphological erosion on the difference image with a structuring element, the structuring element shaped to remove pixels not having at least one neighboring bright pixel in a horizontal direction and at least one neighboring bright pixel in a vertical direction.

9. The method of claim 7, wherein comparing the rendered image data corresponding to the region of interest to the display image data corresponding to the region of interest further comprises filtering the difference image with a filter designed to reduce the intensity of isolated pixels in the difference image.

10. The method of claim 9, wherein comparing the rendered image data corresponding to the region of interest to the display image data corresponding to the region of interest further comprises thresholding the difference image with an intensity threshold and detecting areas containing a number of pixels greater than an area count threshold.

11. The method of claim 10, further comprising generating a notification if areas are detected containing a number of pixels greater than the area count threshold.

12. The method of claim 5, wherein comparing the rendered image data corresponding to the region of interest to the display image data corresponding to the region of interest further comprises removing a background of the display image data corresponding to the region of interest prior to generating the difference image.

13. The method of claim 12, wherein the background of the display image data corresponding to the region of interest is removed by discarding pixels in the display image data corresponding to the region of interest having a value in an alpha channel less than an alpha threshold.

14. The method of claim 13, wherein the alpha channel value is set by a software renderer.

15. A computer device comprising:
a processor adapted to perform the method of claim 1.

16. The computer device of claim 15, wherein the number of pixel locations corresponding to each region of interest is based on a processing speed of the processor.

17. A method of validating image data comprising:
receiving drawing commands to generate a frame of image data;
capturing a frame of display image data;
generating rendered image data corresponding to a plurality of pixel locations encompassing substantially all of the pixel locations in the image data;
comparing the rendered image data to the display image data; and
varying the region of interest between frames such that a combination of regions of interest from other frames encompasses substantially all of the pixel locations in a single frame of the display data.

18. A display system for validating image data comprising a sequence of frames to be displayed, the system comprising:
receiving a plurality of regions of interest at a processor, wherein each region of interest corresponds to a plurality of pixel locations in a frame of the image data;
for each of a plurality of the received regions of interest,
receiving drawing commands at a graphics processor to generate a frame of the image data,
the processor capturing a frame of display image data generated by the graphics processor including image data corresponding to the region of interest from the received drawing commands,
receiving the drawing commands at the processor,
the processor generating rendered image data corresponding to the region of interest from the received drawing commands, and
the processor comparing the rendered image data corresponding to the region of interest to the display image data corresponding to the region of interest, varying the region of interest between frames such that a combination of regions of interest from other frames encompasses substantially all of the pixel locations in a single frame of the display data.

19. The display system of claim 18, wherein a first of the plurality of received regions of interest and a second of the plurality of received regions of interest correspond to different pixel locations.

20. The display system of claim 18, wherein the processor comprises multiple processing units.

* * * * *